July 1, 1930.  C. D. WILLIAMS  1,769,248
LINE TESTER
Filed Nov. 15, 1926  2 Sheets-Sheet 1
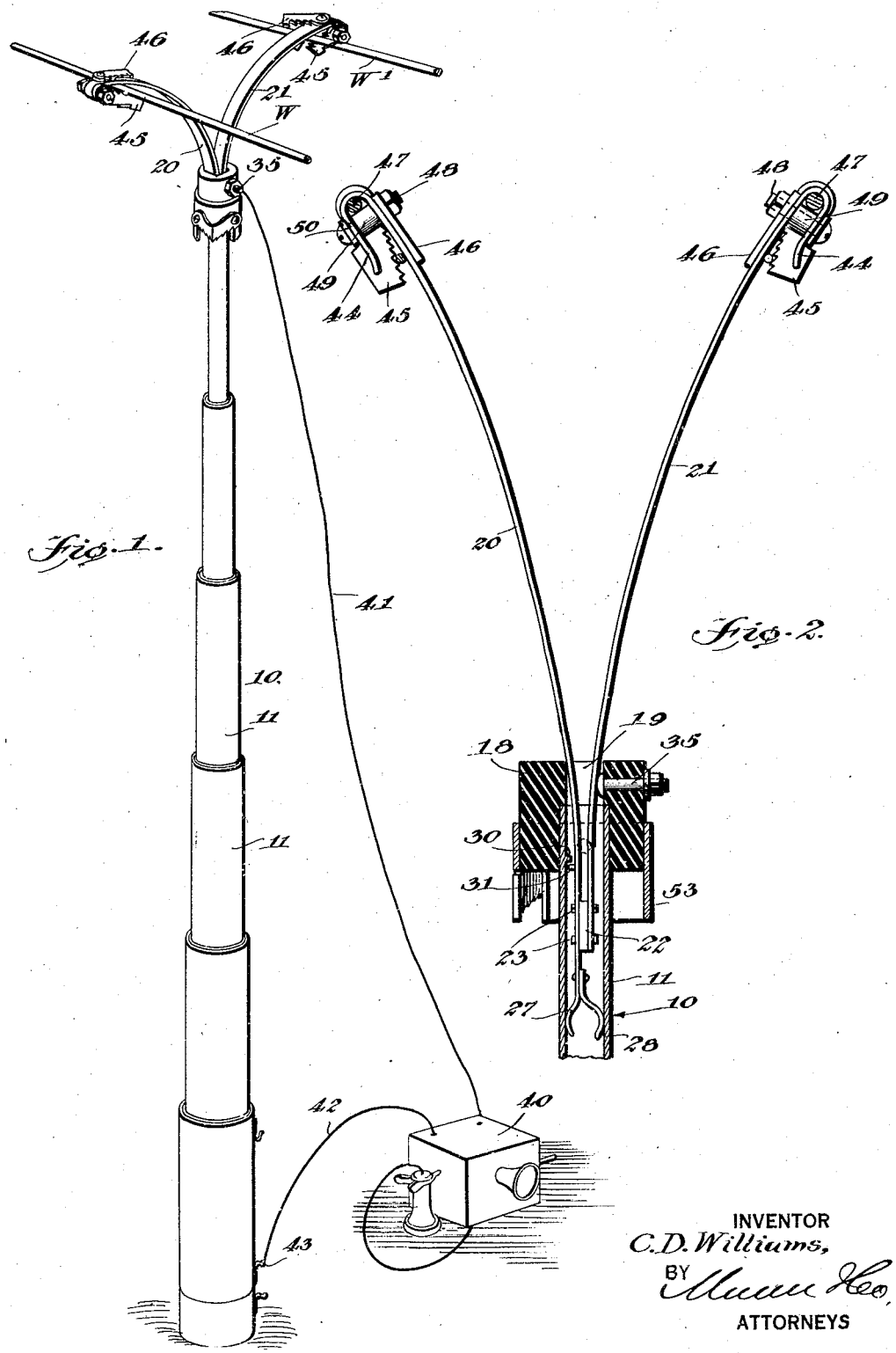
INVENTOR
C. D. Williams,
BY
ATTORNEYS

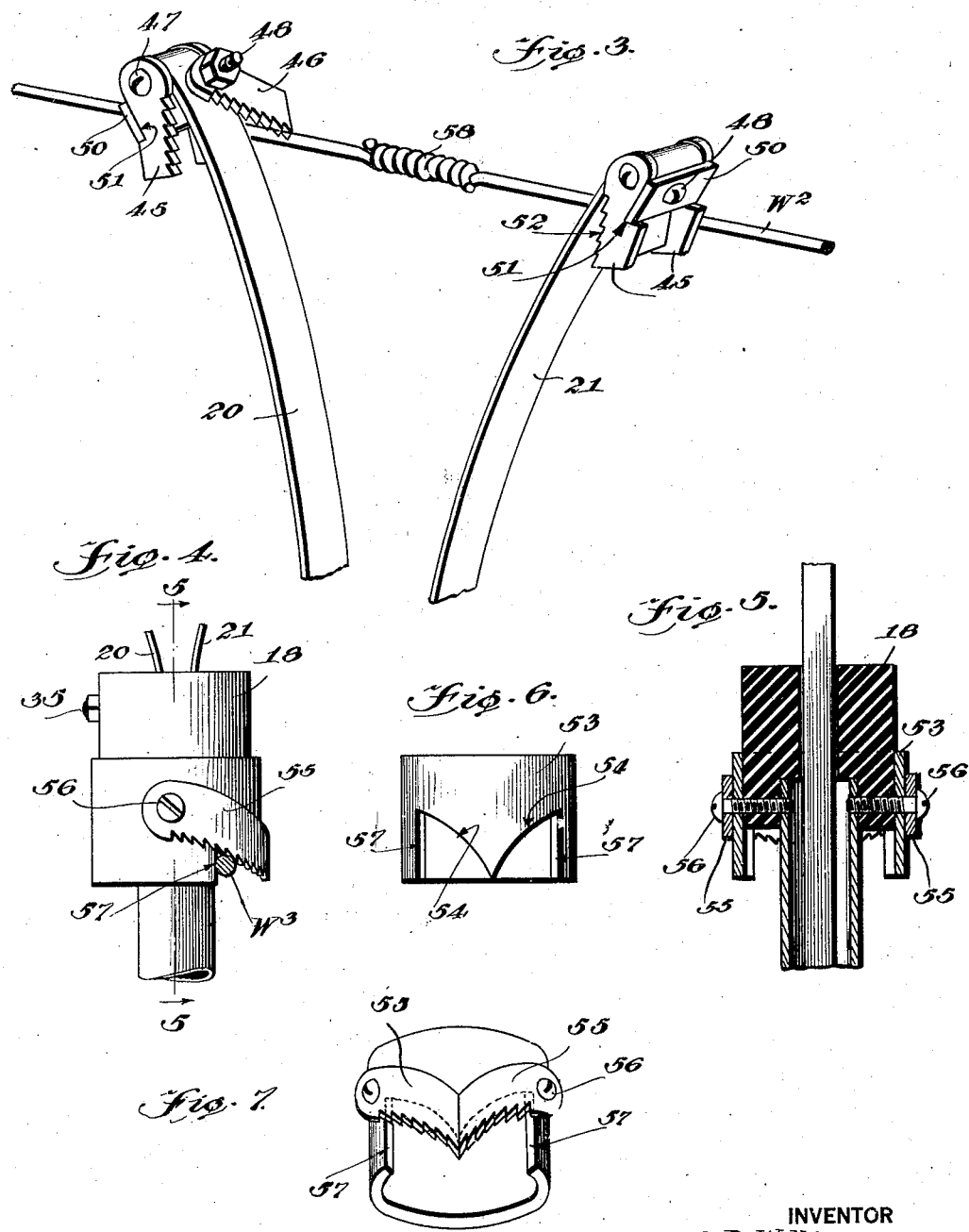

Patented July 1, 1930

1,769,248

UNITED STATES PATENT OFFICE

CHARLES D. WILLIAMS, OF SILVER LAKE, KANSAS

LINE TESTER

Application filed November 15, 1926. Serial No. 148,496.

This invention relates to improvements in line testing apparatus an object being to provide a structural arrangement in a device of this character for making effective contact with the metallic circuits to be tested, regardless of the amount of corrosion, rust, etc., with which the surface of the metal may be coated.

Other objects and advantages appear in the following specification, reference being had to the accompanying drawings in which, Figure 1 is a perspective view of the improved line testing apparatus.

Figure 2 is a sectional view of the testing head and its carried parts,

Figure 3 is a detail perspective view illustrating the use of the device in testing a line splice.

Figure 4 is a detail side elevation of the testing head.

Figure 5 is a vertical section taken on the line 5—5 of Figure 4.

Figure 6 is a detail elevation of the metallic base ring associated with the testing head.

Figure 7 is a detail perspective view of the base ring showing the serrated blades applied.

This invention is an improvement on the line testing apparatus disclosed in Patent No. 1,558,211 of October 20, 1925, one of the outstanding purposes being to improve the contact making elements so that contact may be made with the metal itself regardless of the amount of rust, corrosion, etc., coating the line to be tested. Such portions of the structure as are common with the patent may be briefly described as follows:—

The staff or standard 10 is composed of a plurality of telescoping sections 11 made of copper or other good conducting material. Joints, of a construction described in the patent, connect the various sections, the purpose of the telescopic arrangement being to permit collapsing the staff into a comparatively small size so that the device may be readily carried about.

A head 18 surmounts the innermost and smallest telescopic section 11, this section being at the top of the staff 10 when the staff is extended, as shown in Figure 1. The head is composed of insulating material. It has a central opening 19 in communication with the bore of the telescopic staff.

A pair of line connectors 20 and 21 are slidable in the bore of the staff and in the opening 19 so that they are either closed or extended, depending upon whether they are slid down or up. These connectors comprise flat strips of resilient metal and connected to each other but in spaced relationship by means of the insulating block 22 and a plurality of bolts 23. The bolts are suitably insulated from the connectors so that the respective connectors may remain the separate parts of an electrical circuit.

The connector 20 includes an outwardly curved extension or shoe 27 carrying a somewhat similar shoe 28 for contacting and making frictional engagement with the wall of the innermost section 11. The shoes have sufficient tension to hold the line connector in any particular adjusted position. Means for preventing the line connectors from being withdrawn from the innermost section 11 comprise a stop lug 30 carried by said section 11, and a stop lug 31 carried by the line connector 20.

As already stated, the line connectors are extensible and retractible in respect to the staff 10, and when extended are adapted for connection either with parallel line wires W and W' as in Figure 1 or with a single line wire $W^2$ as in Figure 3. A contact 35, carried by the head 18, has connection with one side of a testing set 40 through a wire 41, the other side of the testing set being connected by means of a wire 42 with a suitable clamp or binding post 43 on the metallic staff 10.

The improvement resides in the contact making elements at the extremities of the connectors 20 and 21 and in the contact making elements carried by the testing head 18. The former elements are more particularly intended for connection with line wires as already stated, the latter element, being of more sturdy construction, is designed for making connection with conductors more likely to be coated with rust and the like than overhead line wires. The description of the construction of the connector 20 will suffice for both.

The outermost extremity of the connector 20 is bent upon itself as at 44 (Figure 2), to provide a yoke and an adequate base for a pair of blades 45 and a single link 46, the former being applied to the edges of the yoke, the latter to the inner face of the yoke.

A bolt 47 passing through the yoke in one direction holds the pair of blades 45 in place, while a bolt 48 passing through the yoke in the opposite direction holds the blade 46 in place. A sleeve 49 fitted on the bolt 48 between the confronting parts of the yoke, prevents an undue closing of the yoke. A clip 50 extends slightly beyond the sides of the yoke and seats in recesses 51 with which the pair of blades 45 are provided along one of the edges. The opposite and inner edges of the blades are serrated at 52 so that a cutting action may be had when the device is applied to a pair of line wires as in Figure 1. The clip 50 serves to limit the swinging movement of the pair of blades 45 in the outward direction, although the blades are not capable of free swinging motion inasmuch as they are clamped in place by the bolt 47. The blade 46 is clamped in such position that the serrated edge extends beyond one edge of the connector 20 (Figure 3), thereby to form a crotch in which the line wire to be tested is to be received.

The testing head 18 has associated structure of such nature as will permit making contact with connectors heavily coated with rust, etc. It can be used to make connection with any single or ground line surface to better advantage than with either of the foregoing connectors. Inasmuch as the testing head is mounted directly upon the staff 10 and obviously more vigorous action can be carried out in the use thereof. The testing head includes a metallic base ring 53, cut out at 54 to provide a pair of openings (Figure 6) over which the cutting blades 55 are secured as shown. The same screws 56 which secure the blades to the ring also secure the ring to the head 18 (Figure 5) and make electrical connection with the staff 10.

It is observed in Figure 6 that the openings 54 have diverging walls terminating at straight edges 57 which extend lengthwise of the ring. The blades 55 are shaped to fit against the ring and to follow the contour of the edges 54. The serrated edges of the blades extend slightly below the foregoing edges 54, the arrangement resulting in the provision of a pair of crotches in which a heavily coated wire $W^3$ (Figure 4) or other conductor may be received. The reader will readily understand that a more sawing action may be had with the testing head arrangement than with the contact making elements of the connectors 20 and 21.

The operation is readily understood. Assume first that it is desired to make certain desired tests of a pair of line wires W and W' (Figure 1). The connectors 20 and 21 having been extended, are thrust up between the line wires and brought down upon them until they are caught in the crotches formed between the connectors and the pairs of blades 45, the diverging position of the connectors readily making this possible. Upon pulling down upon the device, the serrated edges of the blades are made to cut into the wires and thus make good electrical contact for the purposes of the instrument 40.

Assume, next, that it is desired to test the splice 58 of the wire $W^2$. The connectors 20 and 21 are now applied edge-on against the line wire, connection being made at opposite sides of the blades. A downward move causes the serrated edges of the single blades 46 to cut into the metal, as before, and make the desired electrical contact. As already indicated, circumstances may arise when much rust or corrosion is to be cut through before an electrical contact may be made with the connector. In such case, the testing head 18 is employed. The blades 55 are firmly secured to the more or less rigid head 18 and staff 10 so that upon vigorously working the staff, the serrated edges of the blades will be made to cut through the accumulation upon the conductor for the purpose described.

While the construction and arrangement of the improved line testing apparatus is that of a generally preferred form, obviously modifications and changes may be made without departing from the spirit of the invention of the scope of the claims.

I claim:

1. Testing apparatus comprising a connector having a bent head providing a yoke, a pair of serrated blades applied to opposite and parallel edges of the connector, said blades having recesses, a single serrated blade applied to the face of the connector, the various blades being so disposed as to define crotches in which conductors to be tested are to be received; means extending through the yoke in one direction, securing the pair of blades in position, securing means extending through the yoke in the opposite direction holding the single blade in position, and a clip carried by said securing means forming a stop entering the recesses of said pair of blades thus limiting any tendency toward outward movement of said pair of blades.

2. Testing apparatus comprising a staff having an insulating testing head, a metallic ring carried by said head having openings cut therein with walls extending in diverging directions and terminating in straight edges, a pair of serrated blades applied to the ring and partially extending over said opening to define crotches between said straight edges and the serrations of the blade for the reception of a conductor to be tested, and means passing through the blade, ring, and head into the staff securing the parts together and establishing electrical connection between the blades and staff.

3. Testing apparatus for overhead wires comprising a staff of conducting material adapted to form part of an electrical circuit and having its upper end reversely bent, a wire contacting blade having a serrated edge and having its face clamped to and in current conducting connection with one side of the reversely bent end of said staff with its serrated edge positioned at an angle to the opposed adjacent portion of said staff, to define a crotch therewith within which the wire may be entered.

4. Testing apparatus for overhead wires comprising a staff of conducting material adapted to form part of an electrical circuit and having a pair of line connecting arms insulated from each other extending from its upper end, one of said arms being electrically connected to said staff and the other being insulated therefrom, a pair of wire contacting blades with serrated edges and clamped to and in current conducting connection with each of said arm ends with their serrated contacting edges extending at an angle to the arm ends to define therewith a pair of crotches within which the two line wires of a circuit may be entered.

5. Testing apparatus for overhead wire splices comprising a staff of conducting material adapted to form part of an electrical circuit and having a pair of spaced conductor arms insulated from each other extending from its upper end, one of said arms being electrically connected with said staff and the other being insulated therefrom, and contact blades secured to and in electrical contact with said arms extending therefrom at an angle to define crotch formations therewith within which the wire at opposite sides of the splice may be entered.

6. Testing apparatus comprising a staff of conducting material adapted to form part of an electrical circuit and having a head of insulating material mounted on its end, a metallic ring secured to and encircling said head and insulated thereby from said staff, the lower edge of said ring extending below the edge of said head and having a notch cut therein, a curved contact blade secured to said ring and electrically connected to said staff, said blade having its lower edge serrated and extending over one edge of the ring notch to define a crotch formation with the adjacent edge of said notch within which a conductor may be entered.

CHARLES D. WILLIAMS.